United States Patent [19]

Gelb

[11] Patent Number: 4,647,351
[45] Date of Patent: Mar. 3, 1987

[54] PROCESS FOR GENERATING CHLORINE AND CAUSTIC SODA USING A MEMBRANE ELECTROLYSIS CELL COUPLED TO A MEMBRANE ALKALINE FUEL CELL

[75] Inventor: Alan Gelb, Boston, Mass.

[73] Assignee: Physical Sciences Inc., Andover, Mass.

[21] Appl. No.: 779,529

[22] Filed: Sep. 24, 1985

[51] Int. Cl.$^4$ .............................................. C25B 1/46
[52] U.S. Cl. ..................................... 204/98; 204/128; 204/DIG. 4; 429/17
[58] Field of Search ................. 204/98, 128, 277, 278, 204/DIG. 4; 429/17, 19, 101

[56] References Cited

U.S. PATENT DOCUMENTS

| | | | |
|---|---|---|---|
| 4,093,531 | 6/1978 | Babinsky et al. | 204/DIG. 4 |
| 4,246,078 | 1/1981 | Broniewski | 204/98 |
| 4,299,673 | 11/1981 | Broniewski | 204/DIG. 4 |
| 4,305,793 | 12/1981 | Broniewski | 204/DIG. 4 |
| 4,415,413 | 11/1983 | Veber | 204/DIG. 4 |
| 4,502,928 | 3/1985 | Umetani et al. | 204/98 |

OTHER PUBLICATIONS

"Proceedings of the Workshop on Energy Conservation in Industrial Electro-Chemical Processes," Aug. 10–12, 1976, ANL/OEPM-77-1, ed., N. P. Yao et al, pp. 37–82.
"Final Report on Improvements in Energy Efficiency of Industrial Electro-Chemical Processes," ANL/O-EPM-77-2, Jan. 1977, Beck, T. (p. 74).
Chemical and Engineering News, Mar. 1, 1982, p. 10, Greek, B. F. et al.

Primary Examiner—Terryence Chapman
Attorney, Agent, or Firm—George W. Neuner

[57] ABSTRACT

A process for making chlorine gas and concentrating caustic soda comprising:
(1) feeding a brine to the anolyte compartment solution and a dilute NaOH solution to the catholyte compartment of an electrolysis cell comprising a cation-transporting membrane, thereby generating chlorine at the anode, hydrogen at the cathode, and concentrating NaOH in the catholyte solution;
(2) coupling the membrane electrolysis cell to a cation-transporting membrane alkaline fuel cell by providing at least some of the hydrogen generated in the electrolysis cell to the anode of the fuel cell, and splitting the catholyte flow from the catholyte compartment of the electrolysis cell so that it feeds into both the catholyte chamber and the anolyte chamber of the fuel cell in an unequal amount with a greater proportion of the catholyte going into the anion chamber;
(3) concentrating the NaOH in the fuel cell by providing an oxygen source to the catholyte chamber of the fuel cell, and using the oxygen and the hydrogen to generate a current in the fuel cell, thereby causing Na$^+$ to be transported across the membrane and concentrating NaOH in the catholyte chamber; and
(4) collecting the chlorine from the electrolysis cell and the concentrated NaOH from the fuel cell is disclosed.

In a preferred embodiment, the dilute caustic solution from the anolyte chamber of the fuel cell is recycled to the catholyte compartment of the electrolysis cell, thereby providing a closed system.

11 Claims, 2 Drawing Figures

PROCESS FOR GENERATING CHLORINE AND CAUSTIC SODA USING A MEMBRANE ELECTROLYSIS CELL COUPLED TO A MEMBRANE ALKALINE FUEL CELL

BACKGROUND OF THE INVENTION

The present invention relates to an improvement in a process for the production of chlorine and caustic soda using a membrane electrolysis cell coupled to an alkaline fuel cell.

About ten percent of all electric power produced in the United States is consumed by the electrochemical industries. The production of chlorine and caustic soda accounts for about 20% by this consumption. An energy consumption of about 287,000 bbl of oil per day are used in the daily production of approximately 37,000 tons of chlorine. Improving the efficiency of this process will have a significant impact on energy consumption as well as the financial performance of the relevant industry.

Three types of electrolysis cells currently dominate the electrolytic chlorine-caustic industry: (a) mercury, (b) diaphragm and (c) membrane cells. Mercury cells are finding increasingly limited application because of pollution problems and will most certainly be phased out in the near future. Diaphragm cell technology presently accounts for 75% of the U.S. electrolytic chlorine-caustic production. Membrane cell technology is an emerging technology which is being studied extensively in Japan.

In the diaphragm process the cell is divided into anode and cathode compartments by an asbestos diaphragm. Feed brine, i.e. NaCl solution, enters the anode compartment where chlorine gas is liberated. The brine convects through the diaphragm into the cathode compartment in which $H_2$ is produced. The anode and cathode reactions are:

$$2Cl^- \rightarrow Cl_2 + 2e^- \text{ (anode)}$$

$$2H_2O + 2e^- \rightarrow 2OH^- + H_2 \text{ (cathode)}$$

Sodium ions flow through the asbestos diaphragm by convection and under the influence of an imposed electric field. The catholyte typically exits the cell with 10 to 15 wt. percent NaOH and nearly saturated brine. The caustic is purified in a series of evaporation procedures to approximately 50 wt. percent NaOH. The $H_2$ gas produced at the electrolysis cell cathode may be used in several ways as an energy source or as a commercial product.

In the diaphragm process, two steps using approximately equal energy, require the greatest energy inputs—(1) brine electrolysis and (2) caustic purification and concentration.

In the membrane process the electrolysis cell is divided into anode and cathode compartments by a cation-transporting membrane which prevents transport of anions across the membrane, but not cations. The electrode reactions are the same as for the diaphragm cell. The catholyte effluent generally consists of 25 to 30 wt. percent NaOH with approximately 50 ppm NaCl. Again, $H_2$ is produced as a by-product. The most significant differences between the membrane cell and the diaphragm cell are that the NaOH produced from the membrane electrolysis cell contains only trace amounts of NaCl and that less energy is required with the membrane cell for caustic concentration.

Using fuel cells to take advantage of the hydrogen produced during brine electrolysis has been proposed. "Proceedings of the Workshop on Energy Conservation in Industrial Electrochemical Processes," Aug. 10–12, 1976, ANL/OEPM-77-1, Argonne National Laboratory, Contract W-31-109-Eng-38, Ed. N. P. Yao et al.; Beck, T., "Final Report on Improvements in Energy Efficiency of Industrial Electrochemical Processes, "ANL/OEPM-72-2, Electrochemical Technology Corp., for Argonne National Laboratory, Contract W-31-109-Eng-38, Jan. 1977; Greek, B. F. and Fallwell, W. F., Chemical and Engineering News, Mar. 1, 1982, p. 10. Fuel cells are direct conversion devices that convert chemical energy to electrical energy directly by electrochemical reactions. Electricity is generated by the electrochemical oxidation of hydrogen at the cell anode and electrochemical reduction of oxygen at the cathode. The specific electrode reactions depend on the fuel cell electrolyte used. The electrolyte, however, does not participate in the net cell reaction and is thus unaffected. The electrolyte serves the function of transferring electrons between the anode and cathode by ionic transport.

Alkaline fuel cells use aqueous NaOH or KOH for electrolytes. Their half call reactions may be written as:

$$\text{anode: } \tfrac{1}{2}H_2 + OH^- \rightarrow H_2O + e^-$$

and $$\text{cathode: } \tfrac{1}{2}O_2 + H_2O + 2e^- \rightarrow 2OH^-.$$

The net cell reaction is the oxidation of hydrogen to water:

$$H_2 + \tfrac{1}{2}O_2 \rightarrow H_2O.$$

Alkaline fuel cells operate at low temperatures in the range of about 60° to 100° C.

Recently, a coupled diaphgragm/alkaline fuel cell system capable of reducing the process energy consumption has been disclosed. (U.S. Pat. No. 4,246,078 issued Jan. 20, 1981). In this approach, an alkaline fuel cell, operating on sodium hydroxide, is coupled to a diaphragm electrolysis cell to both provide process power and to electrochemically separate the caustic from the contaminant brine. While this process could potentially eliminate most of the boiler energy used to concentrate caustic and reduce the electrical power requirement, several drawbacks exist. Some of the product caustic produced by the electrolysis cell is returned to the brine processing step. This portion of the caustic product is thereby lost to the system because the brine must be acidified before entering the electrolysis cell. Moreover, since the electrolysis cell anolyte must be acidic there is a large increase in the requirement for HCl to neutralize the caustic that is returned to the brine. The HCl for acidification requires the consumption of the hydrogen and chlorine products. Hence this results in a significant decrease of both hydrogen and chlorine product yields. An additional difficulty is the level of impurities in the diaphragm cell process. These impurities severely limit the alkaline fuel cell membrane lifetime.

U.S. Pat. No. 4,246,078 issued Jan. 20, 1981 discloses a hybrid cell where a catholyte, an alkali hydroxide solution, preferably a solution of NaOH and NaCl, from the cathode of an electrolysis cell, is introduced into the anolyte chamber of an alkaline fuel cell. An aqueous medium, water or a dilute alkali metal hydroxide solution, is fed into the fuel cells catholyte chamber. The alkaline fuel cell has a cation selective permeable membrane separating the two compartments. Thereafter, by introducing hydrogen to the anolyte compartment, and a flow of air to the catholyte compartment, electrical energy is generated with the following reactions occurring:

(a) anode: $H_2 + OH^- \rightarrow H_2O + e^-$,
(b) cathode: $H_2O + \frac{1}{2}O_2 + 2e^- \rightarrow 2OH^-$; while cations, e.g., $Na^+$, from the anolyte chamber pass through the membrane and into the catholyte chamber. By this method a concentrated solution up to 50% NaOH is stated to be extracted from the cathode.

Although a concentrated, caustic solution is obtained at the cathode of the fuel cell, some caustic still remains in the anode compartment. While it is theoretically possible to remove substantially all the alkali metal hydroxide from the anolyte, such a process involves operating the fuel cell under short-circuited conditions producing no usable current. Therefore, the solution from the anolyte compartment preferably contains NaCl and some NaOH. This brine solution contaminated with caustic thus becomes a waste product which must be discarded, unless acidified with HCl resulting in loss of product $H_2$ and $Cl_2$.

Thus, further improvements in the production of chlorine and caustic soda are still being sought.

SUMMARY OF THE INVENTION

The present invention provides a more efficient and economical process for producing chlorine gas and caustic soda. The process of the present invention accomplishes this end by coupling a membrane electrolysis cell with a membrane alkaline fuel cell in a novel manner. Thus, in accord with this invention, a process for making chlorine gas and concentrating caustic soda comprises:

(a) feeding a brine to the anolyte compartment solution and a dilute NaOH solution to the catholyte compartment of an electrolysis cell comprising a cation-transporting membrane, thereby generating chlorine at the anode, hydrogen at the cathode, and concentrating NaOH in the catholyte solution;

(b) coupling the membrane electrolysis cell to a cation-transporting membrane alkaline fuel cell by providing at least some of the hydrogen generated in the electrolysis cell to the anode of the fuel cell, and splitting the catholyte flow from the catholyte compartment of the electrolysis cell so that it feeds into both the catholyte chamber and the anolyte chamber of the fuel cell in an unequal amount with a greater proportion of the catholyte going into the anion chamber;

(c) concentrating the NaOH in the fuel cell by providing an oxygen source to the catholyte chamber of the fuel cell, and using the oxygen and the hydrogen to generate a current in the fuel cell, thereby causing $Na^+$ to be transported across the membrane and concentrating NaOH in the catholyte chamber; and (d) collecting the chlorine from the electrolysis cell and the concentrated NaOH from the fuel cell.

In a preferred embodiment, the dilute caustic solution from the anolyte chamber of the fuel cell is recycled to the catholyte compartment of the electrolysis cell, thereby providing a closed process whereby brine solution is fed in and chlorine gas and concentrated caustic solution are obtained with little or no waste by-products. Because of the high efficiency of the process of this invention, excess hydrogen can also be obtained as a product.

DESCRIPTION OF THE INVENTION

In accord with the present invention, it has now been discovered that a highly efficient and economical chlorine/caustic soda process is obtained by splitting the flow of catholyte from the catholyte compartment of a membrane electrolysis cell with the same concentration of an alkali hydroxide solution entering both the anolyte chamber and the catholyte chamber of an alkali fuel cell thereby being able to efficiently concentrate the caustic solution in the catholyte chamber of the fuel cell. Splitting the flow (generally into unequal flows) enables one to design a closed system using recycling to virtually eliminate any waste products and maintain high energy efficiency.

Both membrane electrolysis cells and alkaline fuel cells are well known to the person of ordinary skill in the art. The details regarding the operation, nature of products and construction of the cells themselves have been described in an extensive body of both patent and technical publications. Consequently, the following description is directed primarily to the present invention which involves the combination of a membrane electrolysis cell and a membrane alkaline fuel cell to provide a highly energy efficient and economical process for making chlorine and caustic soda. In the process of the present invention, the brine solution is fed into the anolyte compartment of the electrolysis cell where it is electrolyzed to produce $Cl_2$ gas. Due to the sensitivity of the cell membrane to impurities (e.g., polyvalent cations), this brine should preferably have a preparation step to remove such impurities. Dilute caustic is introduced into the catholyte compartment of the electrolysis cell, $H_2$ gas is produced at the cathode, and caustic is concentrated in the catholyte. The caustic concentration, should generally be to between 15 and 30 wt percent for proper membrane function.

Preferably, the caustic solution is NaOH and the electrolysis cell is fed NaCl. However, other caustic solutions such as KOH can be concentrated and the anolyte compartment of the electrolysis cell is fed KCl. When KOH is concentrated the alkaline fuel cell uses KOH as an electrolyte and when NaOH is concentrated the alkaline fuel cell uses NaOH as an electrolyte.

The caustic solution is preferably concentrated in the catholyte compartment of the membrane electrolysis cell to a concentration of at least 20%, more preferably 25%, most preferably 30%–35%. Thereafter, this concentrated catholyte is used to feed the fuel cell. Surprisingly, in accord with this invention, it has been found that the concentration of caustic solution in a membrane alkaline fuel cell, where both the anolyte chamber and the catholyte chamber are fed by the same concentration of caustic from the catholyte of the electrolysis cell, results in a highly efficient process. Thus, the flow of catholyte from the catholyte compartment of the electrolysis cell is split and one stream is concentrated while the other stream is diluted in NaOH.

Figure 1:
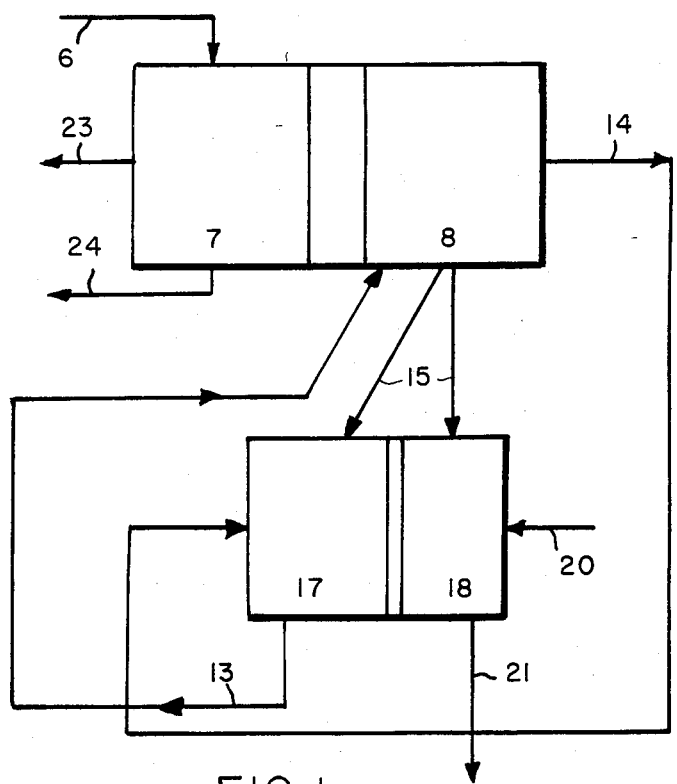
FIG. 1 is a schematic diagram of one embodiment of the present invention using an alkaline fuel cell coupled to a membrane electrolysis cell.

FIG. 1 is a schematic diagram of an alkaline fuel cell coupled to a membrane electrolysis cell that can be used in the present process. NaCl and $H_2O$ are fed (6) into the anolyte compartment (7) of the electrolysis cell (9). The chlorine gas generated at the anode leaves by a conduit (23), and a conduit (24) is provided for the NaCl and $H_2O$ left after electrolysis. A conduit (14) is provided to bring $H_2$ gas generated at the cathode of the electrolysis cell to the anolyte chamber at the fuel cell (19). The catholyte of the electrolysis cell is split (15) so that the partially concentrated NaOH solution enters both the anolyte (17) and the catholyte (18) chambers of the fuel cell. A means (20) is provided for an oxygen source to enter the catholyte compartment of the fuel cell. A means (21) is provided for concentrated NaOH to leave the catholyte chamber and another means (13) is provided for the dilute NaOH from the anolyte chamber to exit and be recycled to the catholtye compartment (8) of the electrolysis cell.

Efficient concentration in the membrane fuel cell is accomplished by using an unequal flow rate such that the anolyte chamber receives a greater percentage of the alkali metal hydroxide solution from the electrolysis cell. Preferably, the ratio of solution going to the anolyte chamber to that going to the cation chamber ranges from about 60:40 to about 80:20 depending on the concentration of NaOH in the electrolysis cell catholyte and the fuel operating parameters such as oxygen flow rate, water transport through the membrane and hydrogen utilization.

The exact ratio to be used is affected by a number of different factors within the fuel cell. These factors can be adjusted to change the optimum split ratio and can readily be determined by the person of ordinary skill in the art, based upon the following disclosure.

The water transport number of the alkaline fuel cell's membrane is one factor to consider. The water transport number is defined as the ratio of water molecules transported across the membrane to sodium ions transported. In order to concentrate caustic in the alkaline fuel cell, it is necessary that the water transport number not be too large. This number is preferably below about 3, more preferably below about 2.8 and most preferably below about 2.0. However, within this range concentration of caustic can be maintained relatively constant by adjusting other factors, such as the oxygen-flow into the cathode. Variation in membrane water transport may be balanced by the ability of the fuel cell to remove water by evaporation and convection out of the cell through gas channels.

The hydrogen utilization also effects the amount of water which leaves the cell. Hydrogen utilization is the fraction of hydrogen generated by the electrolysis cell's cathode which is consumed at the fuel cell's anode. The higher the hydrogen utilization the greater the power delivered by the cell.

After reading this disclosure, the rate of addition of water to the catholyte chamber, the rate of transport of water and sodium ions through the cation membrane into the catholyte, the consumption of water at the cathode and the rate of evaporation of water and convection through the fuel cell gas channels can all be adjusted by the person of ordinary skill in the art to obtain a product catholyte having the desired caustic concentration.

Even after maximal caustic concentration to approximately 50% (by weight) has been achieved, some alkali hydroxide remains in the anion chamber. This dilute solution of alkali hydroxide is returned to the catholyte compartment of the electrolysis cell. Significantly, it has been found that by controlling the water balance, it is possible to create a closed system whereby no product caustic is lost. The only input into the combined electrolysis/fuel cell system is brine. Thus, the system utilizes its own waste product substantially increasing its efficiency.

This contrasts with the system disclosed in U.S. Pat. No. 4,246,078. Recycling the waste product therein would create numerous difficulties. Using the typical waste product of the U.S. Pat. No. 4,246,078 patent from the anode of the alkaline fuel cell, i.e. a NaCl/NaOH solution, recycling requires additional treatment steps to either remove the alkali metal hydroxide or neutralize the alkali metal hydroxide before it can be added to the anolyte compartment of the electrolysis cell. This would substantially increase the cost of the system. Recycling of this waste to the electrolysis cell catholyte would not be justified. In the system of the present invention, by splitting the flow from the cathode of the electrolysis cell to both the catholyte chamber and the anolyte chamber of the fuel cell, surprisingly, water balance can be maintained while still resulting in concentration of caustic to 50 wt. percent and allowing recycling of diluted caustic to the electroylsis catholyte compartment without loss of product or a costly intermediate treatment.

Materials for construction and the construction of fuel cells and electrolysis cells are described in numerous publications, including U.S. Pat. Nos.: 3,098,762; 3,196,048; 3,926,025; 3,511,712; 3,516,866; 3,530,003; 3,764,391; 3,899,403; 3,901,731; 3,957,535; 4,036,717; and 4,051,002, and British Patent Specification Nos.: 1,211,593 and 1,212,387 each of which are incorporated herein by reference.

The cation selective permeable membrane can be solid aliphatic or aromatic sulfonates; phenolics; copolymers of ethylenically unsaturated monomers such as ethylene or propylene with ethylenically unsaturated carboxylic acids or salts thereof and the like.

Gas diffusion type electrodes are used in the practice of this invention. They typically are hydrophilic and may vary widely as is well known to those skilled in the art. They generally consist of a gas diffusion barrier layer providing a catalytic surface. The gas diffusion layer may be catalytic per se or have catalytic properties introduced or promoted by a noble metal and the like. The noble metal can be platinum, although base metals of similar catalytic activity are preferable for economic reasons.

The cells may be operated at temperatures well-known to those of ordinary skill in the art. The temperature generally ranges between 60° C. to 100° C.

Although pure oxygen can be used as the source of oxygen, the most common source is air.

Figure 2:
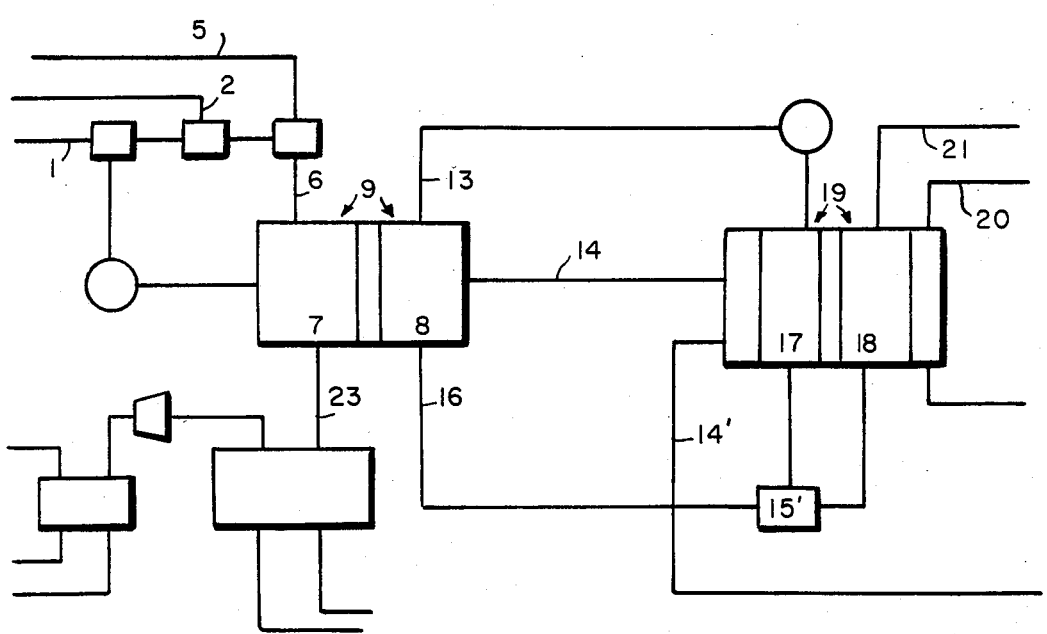
FIG. 2 is a schematic diagram of one embodiment of a process for producing chlorine and concentrating caustic of the present invention.

FIG. 2 shows one embodiment of the above-described system. In this system, HCl (5), NaCl (2), and $H_2O$ (1) enter the anolyte chamber (7) of an electrolysis membrane cell (9) by a conduit (6). Recycled sodium hydroxide, and $H_2O$ (13) under the catholyte chamber (8) of the electrolysis cell via a separate conduit (13). At the anode, chlorine gas is generated which leaves by a separate conduit (23), thereinafter, the chlorine is dried and placed in condition for commercial use (28). At the cathode of the electrolysis cell, hydrogen gas is generated. A conduit (14) is provided to bring this gas to the anode of the alkaline fuel cell (19). The gas is then used to power the alkaline fuel cell. Hydrogen that is not used is collected and stored by use of a separate conduit (14). A means (15') is provided to split the flow of catholyte (16) from the electrolysis cell containing the partially concentrated sodium hydroxide effluent from the cathode so that it enters both the anolyte chamber (17) and the catholyte chamber (18) of the alkaline fuel cell (19). A means (20) is also provided for an oxygen source to enter the cathode compartment of the alkaline fuel cell. The hydrogen and the oxygen power the alkaline fuel cell. As described above, sodium ions in the anolyte chamber pass through the cation membrane and enter the catholyte chamber and, thus, concentrate the caustic in the catholyte effluent. A means (21) is provided for the concentrated sodium hydroxide product to exit. A means (13) is also provided for the diluted sodium hydroxide solution from the anolyte compartment to exit and return to the catholyte compartment of the electrolysis cell.

The system disclosed herein provides considerable savings over the conventional process for concentrating the caustic soda and generating chlorine. Additionally, because it is easy to recycle the fuel cell anolyte in the process of the present invention and thus utilize the waste sodium hydroxide and, because of its high efficiency, excess hydrogen gas is obtained as a product.

It is appreciated that those skilled in the art, upon consideration of this disclosure, may make modifications and improvements thereon without departing from the spirit and scope of this invention.

I claim:

1. A process for making caustic soda and chlorine gas, said process comprising:
    (a) feeding a brine to an anolyte compartment solution and a dilute alkali hydroxide solution to a catholyte compartment of an electrolysis cell comprising a cation-transporting membrane, thereby generating chlorine at the anode, hydrogen at the cathode, and concentrating caustic in the catholyte solution;
    (b) coupling the membrane electrolysis cell to a cation-transporting membrane alkaline fuel cell by providing at least some of the hydrogen generated in the electrolysis cell to the anode of the fuel cell, and splitting the catholyte from the catholyte compartment of the electrolysis cell so that it feeds into both the catholyte chamber and the anolyte chamber of the fuel cell in an unequal amount with a greater proportion of the catholyte going into the fuel cell anolyte chamber;
    (c) concentrating the alkali hydroxide in the fuel cell by providing an oxygen source to the catholyte chamber of the fuel cell, and using the oxygen and the hydrogen to generate a current in the fuel cell, thereby causing cations to be transported across the membrane and concentrating the caustic in the catholyte chamber; and
    (d) collecting the chlorine from the electrolysis cell and the concentrated caustic from the fuel cell.

2. The process of claim 1 wherein the alkali hydroxide is NaOH.

3. The process of claim 2 which further comprises recycling the dilute NaOH solution from the anolyte chamber of the fuel cell to a catholyte compartment of the membrane electrolysis cell and further adjusting the ratio of catholyte flow to the catholyte chamber and anolyte chamber of the fuel cell to maintain the water balance of the coupled system.

4. The process of claim 2 wherein the membrane of the fuel cell has a water transport number of about 2.8 or less.

5. The process of claim 1 wherein excess $H_2$ is collected.

6. The process of claim 1 wherein the cation-transporting membrane comprises a material selected from the group consisting of aliphatic sulfonates, aromatic sulfonates, phenolics and copolymers of ethylenically unsaturated monomers with ethylenically unsaturated carboxylic acids or salts thereof.

7. The process of claim 1 wherein the alkaline fuel cell has an alkaline solution selected from the group consisting of KOH or NaOH and the electrolysis cell uses KCl or NaCl respectively.

8. The process of claim 7 wherein the alkaline solution is NaOH and the electrolysis cell uses NaCl.

9. The process of claim 1 wherein the electrodes of the fuel cell comprise a base metal having a catalytic activity similar to platinum.

10. The process for making chlorine gas and caustic soda in accord with claim 9, said process further comprising the steps of:
    (e) preparing a brine solution to eliminate cations harmful to the membrane of the electrolysis cell;
    (f) feeding the prepared brine into the anolyte compartment of the electrolysis cell;
    (g) concentrating a caustic solution in the fuel cell by adding $H_2$ generated at the cathode of the electrolysis cell to the anolyte chamber of the fuel cell, and adding air to the catholyte chamber of the fuel cell, thereby using the $H_2$ and the air to generated electricity in the fuel cell;
    (h) recycling to the catholyte compartment of the electrolysis cell the dilute caustic solution produced in the anolyte chamber of the fuel cell; and
    (i) removing the concentrated caustic solution produced in the catholyte chamber of the fuel cell.

11. The process of claim 1 wherein the fuel cell is operated in the range of about 60° to 100° C.

* * * * *